(12) United States Patent
Cai et al.

(10) Patent No.: US 8,894,721 B2
(45) Date of Patent: Nov. 25, 2014

(54) BEAM WELDING OF A MULTI-SHEET WORK STACK WITH A SINGLE COMMON WELDING INTERFACE

(75) Inventors: Wayne W. Cai, Troy, MI (US); Thomas B. Stoughton, Birmingham, MI (US); Xiang Zhao, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 711 days.

(21) Appl. No.: 13/069,476

(22) Filed: Mar. 23, 2011

(65) Prior Publication Data

US 2012/0244416 A1 Sep. 27, 2012

(51) Int. Cl.
- *H01M 4/82* (2006.01)
- *B23K 26/00* (2014.01)
- *B23K 15/00* (2006.01)
- *H01M 4/13* (2010.01)

(52) U.S. Cl.
USPC ............... 29/623.1; 219/121.64; 219/121.14; 429/211

(58) Field of Classification Search
USPC ........ 219/121.63, 121.64; 29/623.1; 429/158, 429/160
See application file for complete search history.

(56) References Cited

U.S. PATENT DOCUMENTS

| | | | |
|---|---|---|---|
| 3,766,490 A * | 10/1973 | Strozyk | 372/68 |
| 4,251,709 A * | 2/1981 | Schumacher | 219/121.14 |
| 6,037,559 A | 3/2000 | Okabe et al. | |
| 6,723,950 B1 * | 4/2004 | Lund | 219/121.64 |
| 7,727,672 B2 * | 6/2010 | Kikuchi et al. | 429/211 |
| 2003/0190522 A1 * | 10/2003 | Ogata | 429/179 |
| 2011/0020690 A1 * | 1/2011 | Khakhalev et al. | 429/121 |

FOREIGN PATENT DOCUMENTS

| | | | |
|---|---|---|---|
| JP | 09206969 | * | 8/1997 |
| JP | 09206969 A | | 8/1997 |
| JP | 2000005889 A | | 1/2000 |
| JP | 2005152993 A | | 6/2005 |

* cited by examiner

*Primary Examiner* — Ula Corinna Ruddock
*Assistant Examiner* — Thomas H. Parsons
(74) *Attorney, Agent, or Firm* — Quinn Law Group, PLLC

(57) ABSTRACT

A method for beam welding a multi-sheet work stack includes positioning a first sheet adjacent to a second sheet, and positioning a third sheet adjacent to the second sheet such that a single common welding interface is defined. An energy beam is directed onto the interface until a fusion weld forms along the interface. The third sheet may define a flange or a tab portion. The flange portion may be placed in direct contact with the first sheet along the interface, while the tab portion may be inserted into a slot of the second sheet to contact the first sheet at the interface. The beam may be a laser or ion beam. The lower melting temperature sheet may be positioned farther from the source of the energy beam than the other sheets. The welded assembly may be a battery module, with the sheets being an interconnect member and battery tabs.

11 Claims, 2 Drawing Sheets

BEAM WELDING OF A MULTI-SHEET WORK STACK WITH A SINGLE COMMON WELDING INTERFACE

TECHNICAL FIELD

The present disclosure relates to a method of beam welding a multi-sheet work stack, i.e., a work stack having three or more sheets, and an assembly constructed according to the present method.

BACKGROUND

Laser welding is a widely used commercial process in which a laser beam irradiates a targeted area of a work stack. Electron beams may be used in a similar manner. The irradiated material changes to a liquefied state due to the intensity of the laser beam. A fusion spot weld or weld seam results when the liquefied material cools. Beam welding can be used to form a fusion weld completely through the thickness of a pair of adjacent sheets in a typical work stack having two sheets. However, a suboptimal fusion weld may result when beam welding a work stack having three or more sheets, especially when the various sheets are constructed of dissimilar materials.

SUMMARY

A method is disclosed herein for beam welding a multi-sheet work stack. As used herein, the term "beam welding" refers to the process of forming a fusion weld using a laser beam, an electron beam, or another suitably concentrated energy beam. The term "multi-sheet work stack" refers to a stack up of three or more sheets, regardless of the relative thickness of the sheets. Beam welding of a two-piece work stack is commonly performed by forming a lap joint through the thickness of the two adjacent sheets. However, conventional lap joint welding techniques may be difficult to conduct effectively when the number of sheets exceeds two, particularly when the sheets are constructed of different materials.

Additionally, the welding of (n) sheets stacked or positioned in the usual lap-joining manner, i.e., with the sheets perpendicular or slightly angled with respect to the axis of the laser beam, forms (n−1) different welding interfaces. For instance, four stacked sheets (n=4) forms three different welding interfaces, while a single welding interface is present in a conventional two-piece work stack (n=2). The present method and its various embodiments helps enable the effective beam welding of such a work stack.

The sheets described herein may be constructed of copper or aluminum in example embodiments. Copper has a substantially higher melting temperature (1080° C.) than aluminum (660° C.). Additionally, some of the sheets may be relatively thin relative to other sheets used in the same work stack. The different melting temperatures and the presence of the thin sheets can provide unique challenges to successful beam welding. These challenges are also addressed by the present method.

In particular, a method for beam welding a multi-sheet work stack is disclosed herein. The method includes positioning a first sheet adjacent to a second sheet, and then positioning a third sheet adjacent to the second sheet such that a single common welding interface is defined by the three sheets. A fusion weld is then formed by directing an energy beam onto or along the single common welding interface for a calibrated duration.

In one embodiment, the third sheet may define a flange portion along one of its edges. In another embodiment, the third sheet may define a tab portion. The flange portion may be placed in direct contact with the first sheet along the single common welding interface, either by wrapping the flange portion around an edge of the first sheet or by placing the flange portion on a surface of the first sheet, depending on the embodiment. The tab portion may be inserted into a slot defined by the second sheet so as to contact the first sheet at the single common welding interface. In another embodiment, some of the sheets may define notches or cutout areas which allow the first and third sheets to be placed adjacent to each other despite the presence of any intervening sheets.

The multi-sheet work stack may be optionally configured as a battery module. In such an embodiment, the first sheet may be a conductive bus bar or interconnect member of the battery module, and the second and third sheets may be different battery tabs of the same battery module.

A welded assembly is also disclosed. The welded assembly includes a first sheet, a second sheet positioned adjacent to the first sheet, and a third sheet positioned adjacent to the second sheet. A work stack with a single common welding interface is defined by the first, second, and third sheets. A fusion weld is formed using an energy beam which joins the first, the second, and the third sheets along the single common welding interface.

The above features and advantages and other features and advantages of the present invention are readily apparent from the following detailed description of the best modes for carrying out the invention when taken in connection with the accompanying drawings.

DESCRIPTION

Figure 1:
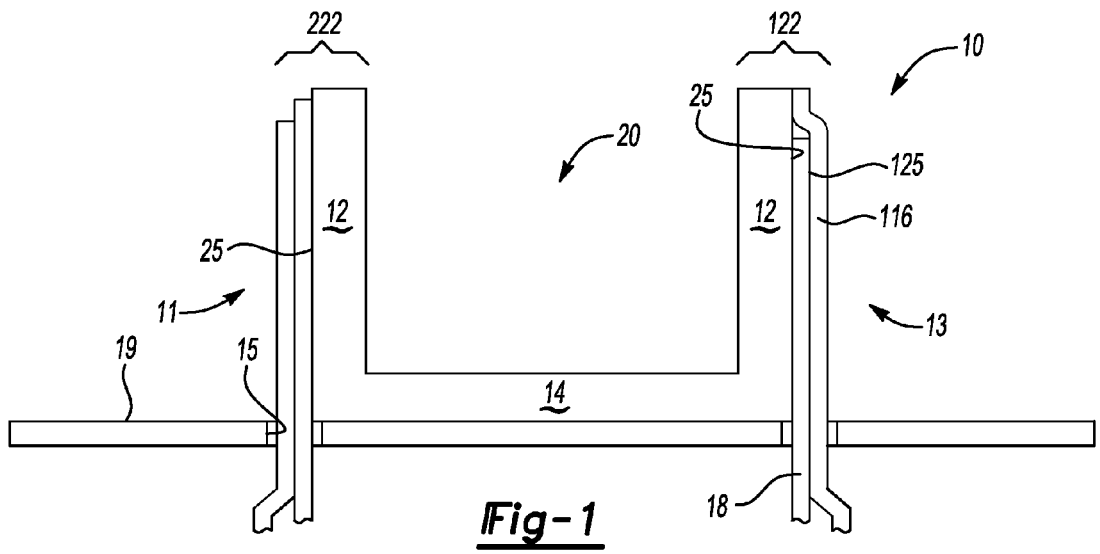
FIG. 1 is a schematic end view of a multi-sheet work stack in the form of an example battery module, with the work stack having an example single common welding interface on one side of the battery module.

Referring to the Figures, wherein like reference numerals refer to like components, a welded assembly 10 is shown in FIG. 1 as an example battery module of the type that may be used in automotive, industrial, household, or various other applications. Other multi-assemblies constructed from multi-sheet stackups or work stacks, i.e., three or more sheets, may be formed via the present method, with the battery module of FIG. 1 used solely for illustrative purposes.

The example battery module may be configured as a rechargeable lithium-ion polymer battery, although it is not limited to such a design. In one embodiment, the battery module may be configured to provide a voltage output sufficient for powering one or more traction motors (not shown) aboard a hybrid electric vehicle (HEV), an electric vehicle (EV), an extended-range electric vehicle (EREV), or the like, e.g., approximately 300 to 400 VDC or more depending on the application. Such levels are typical for electric-only (EV) propulsion modes.

The battery module may include one or more electrochemical battery cells (not shown) having sheets 116 and 18, e.g., electrode extensions or battery tabs in the embodiment shown. The sheets 116, 18 may be positioned adjacent to each other within a battery housing, with only the upper portion or interconnect board 19 of such a housing shown in FIG. 1 for simplicity. The interconnect board 19 may define apertures 15 through which the sheets 116 and 18 can extend. The sheets 116 and 18 may be constructed of a different material than the interconnect member 20 in one embodiment.

Any number of sheets, regardless of the nature of the welded assembly 10, may be "stacked" or otherwise positioned adjacent to each other to form a single common welding interface 25, even if one or more other welding interfaces 125 are present. Two possible example configurations for doing this are a slotted design, i.e., the conventional work stack 222 shown on side 11 of the welded assembly 10 (see FIG. 3 for more a detailed internal depiction), and a flanged sheet design, i.e., work stack 122 shown on side 13 (also see FIG. 2) defining a single common welding interface 25.

The sheets 116, 18 of either design may be beam welded to another sheet 12, e.g., a portion of a conductive bus bar or interconnect member 20 in the example battery embodiment shown in FIG. 1. In a possible embodiment, the sheet 12 may be joined to another sheet 14, e.g., a floor of the interconnect member 20. For simplicity, three-piece work stacks 122 and 222 are described herein, i.e., sheets 12, 116, and 18, however more than three sheets may be used to form the work stacks 122, 222 as will be understood by those of ordinary skill in the art.

Figure 2:
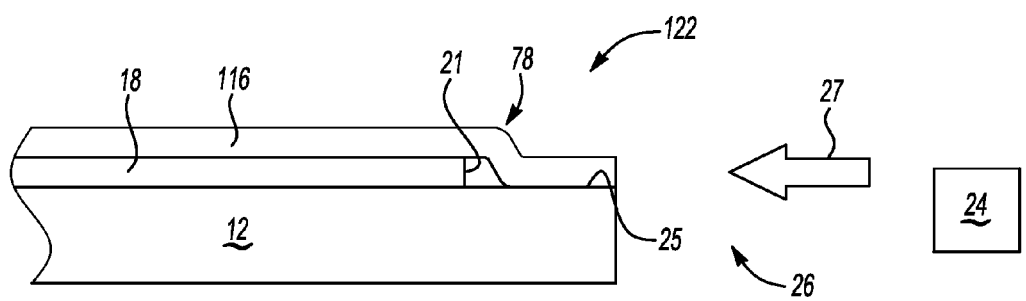
FIG. 2 is a schematic side view illustration of a multi-sheet work stack having a sheet defining a flange portion for forming a single common welding interface in one embodiment.

Referring to FIG. 2, the work stack 122 may be formed using the flanged design shown on side 13 of FIG. 1. The work stack 122 may include sheets 116 and 18, a portion of each being positioned adjacent to a sheet 12 to define a single common welding interface 25. As used herein, this term refers to a welding interface which is shared by or in common with each of the sheets 116, 18, and 12. The sheet 12 may in some configurations be substantially thicker than the sheets 116 and 18, such as when the sheet 12 is part of the interconnect member 20 of FIG. 1 and the sheets 116 and 18 are battery tabs.

A beam source 24, e.g., a neodymium-doped yttrium aluminum garnet (Nd:YAG)-type laser device, an infrared laser device, an electron beam gun, or other suitable energy beam source is positioned adjacent to the work stack 122, e.g., at a common end 26 of the sheets 12, 18, and 16. The beam source 24 generates an energy beam 27 that irradiates a targeted area of the work stack 122 from the common end 26.

In the embodiment shown in FIG. 2, the sheet 18 may be placed immediately adjacent to the sheet 12. The sheet 16 may have a flange portion 78, which may bend around an edge 21 of the sheet 18 as shown to thereby rest on or directly contact the sheet 12 at or along the single common welding interface 25. Such an embodiment allows for creation of the single common welding interface 25 with no formation or shaping of the sheet 18. Once again, the sheets 12, 16, and 18 may be part of any welded assembly, and not just the example welded assembly 10 shown in FIG. 1. Another possible configuration for the flange portion 78 is described below with reference to FIG. 4.

Figure 3:
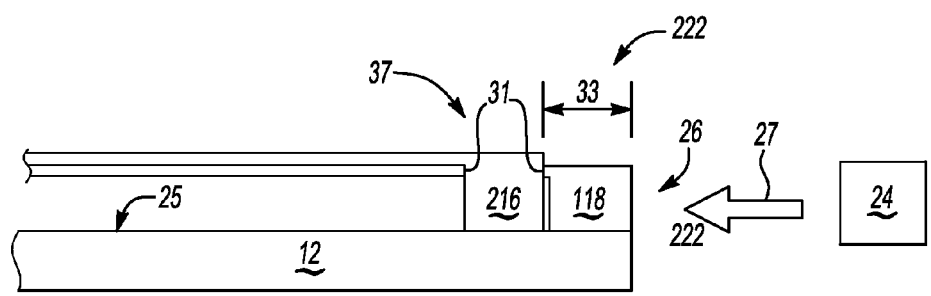
FIG. 3 is a schematic side view illustration of a multi-sheet work stack having a sheet with a slot for receiving a tab portion of another sheet for forming a single common welding interface in another embodiment.

Referring to FIG. 3, an alternative work stack 222 may include a sheet 118 which defines an opening or slot 31. A tab portion 37 of an alternatively configured sheet 216 may be inserted into the slot 31 until the tab portion 37 rests on or contacts the sheet 12 at the single common welding interface 25. From the perspective of the common end 26, the single common welding interface 25 is thus defined as with the embodiment shown in FIG. 2.

In an embodiment in which a given sheet has a higher melting temperature than another sheet, the sheet having the lower melting temperature may be placed further away from the beam source 24, e.g., a distance or dimension (arrows 33) away from the sheet having the lower melting temperature. For example, the sheet 216, when it is constructed of copper having a melting temperature of approximately 1080° C., may be staged a distance (arrows 33) away from the sheet 118 when the latter is constructed of aluminum with a melting temperature of approximately 660° C.

This relative positioning may allow welding energy from the energy beam (arrow 27) to weld the sheet 118 while total energy remains high. As the beam energy dissipates within the work stack 222, a lower amount of beam energy may be available for welding the sheet 216 to the sheet 12. By carefully selecting the dimension (arrows 33) based in part on the materials of construction of the sheets 216, 118, and 12, and by forming the fusion weld from the common end 26 along the single common welding interface 25 rather than as a lap joint across multiple different welding interfaces, beam welding is effectively enabled for the work stack 222.

Figure 4:
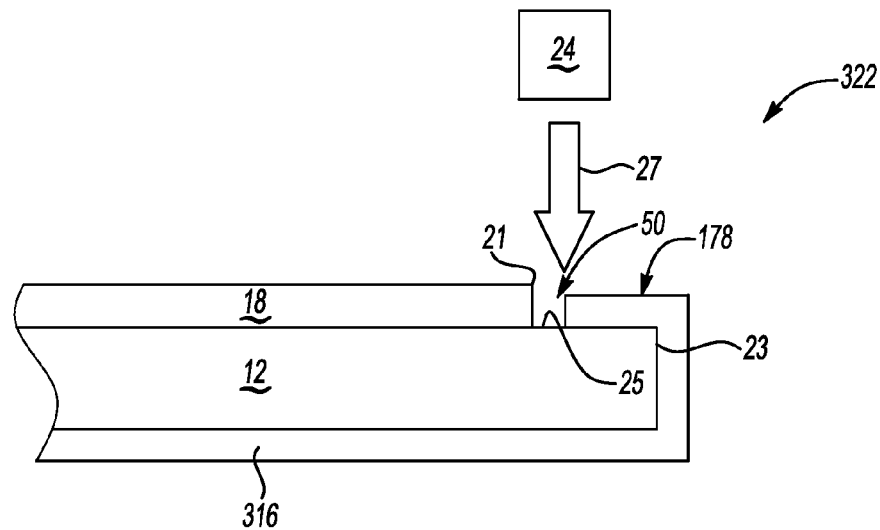
FIG. 4 is a schematic side view illustration of a multi-sheet work stack which has a sheet defining another flange portion.

Referring to FIG. 4, another work stack 322 may be formed from sheets 12, 18, and an alternatively configured sheet 316. The sheet 316 defines a flange portion 178, which may wrap around an edge 23 of the sheet 12. The beam source 24 directs an energy beam (arrow 27) into the single common welding interface 25. A small gap 50 may exist between the edge 21 of sheet 18 and the flange portion 178 to permit the energy beam 27 to reach the single common welding interface 25, which may be a point or zone where the sheets 12, 18, and 316 meet. The size of the gap 50 is exaggerated in FIG. 4 for illustrative clarity, with the actual size of the gap 50 potentially varying with the design.

Figure 5:
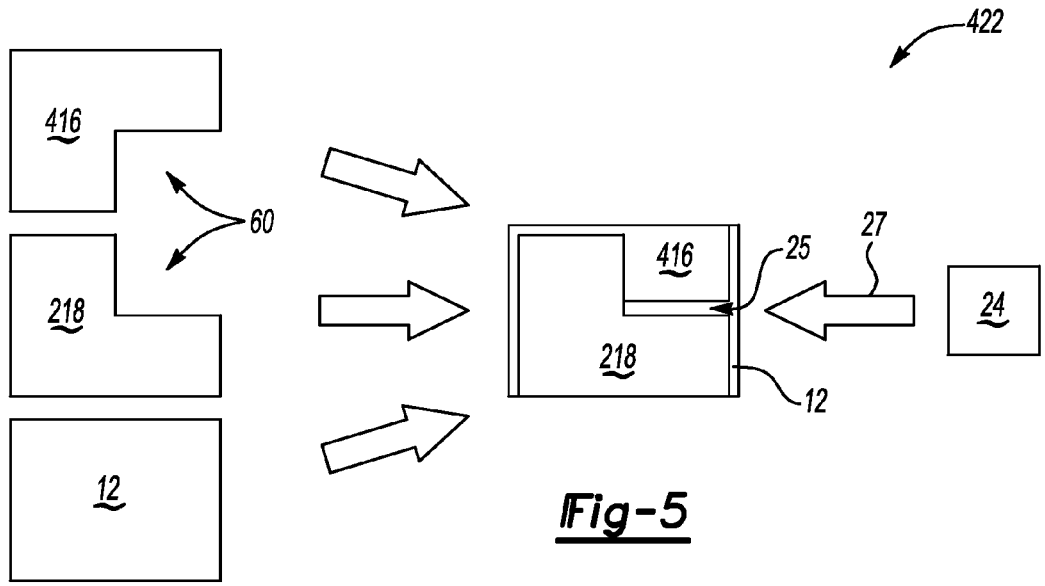
FIG. 5 is a schematic plan view illustration of a welded multi-sheet work stack having notched sheets for forming a single common welding interface in yet another embodiment.

Referring to FIG. 5, a plan view of multiple sheets 12, 416, and 218 shows yet another possible embodiment. The sheets 12, 218, and 416 may be configured as shown, and then stacked to form a work stack 422. The sheets 218 and 416 may define a notch 60, e.g., a rectangular or square notch formed by punching or cutting out and removing material. As shown in FIG. 5, sheet 416 may be stacked on top of and thus positioned adjacent to sheet 12, and sheet 218 may be likewise stacked on top of sheet 416. The beam source 24 can be controlled to direct the energy beam (arrow 27) at the single common welding interface 25 as defined by the sheets 12, 218, and 416. This may occur during butt welding as shown. Alternatively, the beam source 24 may be positioned so as to direct the energy beam into the single common welding interface 25 in a direction perpendicular to the plane of the work stack 422, i.e., lap joint welding. The size and shape of the notches 60 may vary depending on the application.

Figure 6:
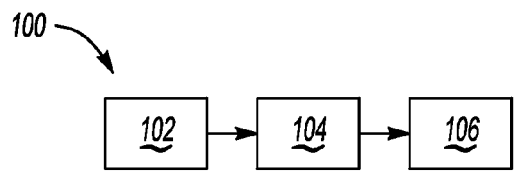
FIG. 6 is a flow chart describing a method for beam welding a multi-sheet work stack.

Referring to FIG. 6, a method 100 for beam welding a multi-sheet work stack begins at step 102. In this step, a first sheet is positioned adjacent to a second sheet. For instance, in the embodiment shown in FIGS. 2 and 4, the sheet 12 may be placed adjacent to the sheet 18. In the embodiment shown in FIG. 3, the sheet 12 may be placed adjacent to the sheet 118. The method 100 then proceeds to step 104. In the embodiment shown in FIG. 5, the sheet 12 may be placed adjacent to the sheet 416.

At step 104, the method 100 may include positioning a third sheet adjacent to the first sheet. For instance, in the embodiment shown in FIG. 2, the flange portion 78 of sheet 116 may be placed adjacent to sheet 12, while in the embodiment of FIG. 3, the tab portion 37 of sheet 216 may be inserted into the slot 31 of sheet 118, and thus placed adjacent to sheet 12. In the embodiment of FIG. 4, the flange portion 178 may be placed adjacent to sheet 12 by wrapping or positioning the flange portion 178 around the edge 23 of sheet 12. In the embodiment of FIG. 5, the sheet 218 may be placed adjacent to sheet 12 due to the existence of the notch 60 in sheet 416. That is, the notch 60 in sheet 416 removes a sufficient amount of intervening material from between the sheets 12 and 218, thus placing these sheets adjacent to each other at the single common welding interface 25. The method 100 then proceeds to step 106.

Step 106 may include directing the energy beam 27 (see FIGS. 2 and 3) into the single common welding interface 25 for a duration sufficient for forming a fusion weld at or along the single common welding interface 25. The various materials of construction possible for the work stacks 122, 222, 322, and 422, respectively, are described above.

While the best modes for carrying out the invention have been described in detail, those familiar with the art to which this invention relates will recognize various alternative designs and embodiments for practicing the invention within the scope of the appended claims.

The invention claimed is:

1. A method for beam welding a multi-sheet work stack using a beam source, comprising:
   positioning a first sheet adjacent to a second sheet;
   positioning a third sheet adjacent to the second sheet such that a single common welding interface is defined in the work stack by the first, the second, and the third sheets, wherein the third sheet defines one of: a flange portion and a slot which receives a tab portion of the second sheet, and wherein positioning the third sheet adjacent to the second sheet includes, when the third sheet defines the flange portion, placing the flange portion in direct contact with the first sheet along the single common welding interface and, when the third sheet defines the slot, inserting the tab portion into the slot so that the tab portion contacts the first sheet along the single common welding interface;
   positioning the beam source adjacent to a common end of the first, second, and third sheets; and
   directing an energy beam from the beam source onto the single common welding interface for a duration sufficient for forming a fusion weld along the single common welding interface.

2. The method of claim 1, wherein the third sheet defines the flange portion, and wherein placing the flange portion in direct contact with the first sheet along the single common welding interface includes wrapping the flange portion around an edge of one of the first sheet and the second sheet.

3. The method of claim 1, wherein directing an energy beam from a beam source includes directing one of a laser beam and an ion beam.

4. The method of claim 1, further comprising:
   determining which of the second sheet and the third sheet has a higher melting temperature relative to the other;
   positioning the sheet having the higher melting temperature a first distance away from a source of the energy beam; and
   positioning the sheet having the lower melting temperature a second distance away from the source of the energy beam, wherein the first distance is less than the second distance.

5. A method for beam welding a battery module using a beam source, wherein the battery module includes an interconnect member, a first battery tab that defines one of a flange portion and a slot, and a second battery tab, the method comprising:
   positioning the interconnect member adjacent to the first battery tab;
   positioning the second battery tab adjacent to the first battery tab such that a single common welding interface is defined by the interconnect member, the first battery tab, and the second battery tab, including placing the flange portion in direct contact with the interconnect member along the single common welding interface when the first battery tab defines the flange portion and, when the first battery tab defines the slot, inserting the tab portion into the slot so that the tab portion contacts the interconnect member along the single common welding interface;
   positioning the beam source adjacent to a common end of the interconnect member, the first battery tab, and the second battery tab; and
   directing an energy beam from the beam source and onto the welding interface for a duration sufficient for forming a fusion weld along the single common welding interface.

6. The method of claim 5, wherein directing an energy beam from a beam source includes directing one of a laser beam and an ion beam.

7. The method of claim 6, including directing the laser beam, wherein directing the laser beam includes directing one of a neodymium-doped yttrium aluminum garnet (Nd:YAG)-type laser and an infrared laser device.

8. The method of claim 5, further comprising:
   determining which of the first and the second battery tabs has a higher melting temperature;
   positioning the battery tab having the higher melting temperature a first distance away from a source of the energy beam; and
   positioning the battery tab having the lower melting temperature a second distance away from the source of the energy beam, wherein the first distance is less than the second distance.

9. A welded assembly comprising:
   a first sheet;
   a second sheet positioned adjacent to the first sheet;
   a third sheet positioned adjacent to the second sheet such that a work stack with a single common welding interface is defined by the first sheet, the second sheet, and the third sheet, wherein the third sheet defines one of: a flange portion positioned on the first sheet and a slot within which is positioned a tab portion of the second sheet; and
   an energy beam-welded fusion joint which joins the first sheet, the second sheet, and the third sheet along the single common welding interface.

10. The welded assembly of claim 9, wherein the welded assembly is a battery module.

11. The welded assembly of claim 9, wherein the first sheet is an interconnect member of the battery module, and wherein the second sheet and the third sheet are battery tabs of the battery module.

* * * * *